Aug. 13, 1963 V. O. ARMSTRONG 3,100,610
STABILIZING SYSTEM FOR A HELICOPTER
Filed April 3, 1962 6 Sheets-Sheet 1

INVENTOR.
Victor O. Armstrong

Aug. 13, 1963   V. O. ARMSTRONG   3,100,610
STABILIZING SYSTEM FOR A HELICOPTER
Filed April 3, 1962   6 Sheets-Sheet 4

INVENTOR.
Victor O. Armstrong
BY

Aug. 13, 1963　　　V. O. ARMSTRONG　　　3,100,610
STABILIZING SYSTEM FOR A HELICOPTER
Filed April 3, 1962　　　　　　　　　　　　6 Sheets—Sheet 5

INVENTOR.
Victor O. Armstrong
BY

3,100,610
STABILIZING SYSTEM FOR A HELICOPTER
Victor O. Armstrong, 13303 Debell St., Pacoima, Calif.
Filed Apr. 3, 1962, Ser. No. 184,842
13 Claims. (Cl. 244—17.25)

This invention relates to a stabilizing system for a helicopter.

Other helicopters, because of their general configuration and design, are inherently unstable, that is, when the rotor is disturbed by any external force it is displaced relative to the center of gravity of the vehicle and causes a pendulum oscillation vibration of the fuselage relative to the rotor. This motion which is not dampened become progressively worse until control action is taken to dampen the vibrations.

This oscillation is such that with the gyroscopic forces in effect and when using a flapping blade there is created as a disturbance, a rotor angle of attack ninety degrees from the original disturbance.

Both of these disturbances become progressively worse and are not self dampening in the general helicopter. This condition will exist on any machine in which there is a direct tie between the fuselage or passenger carrying member and the helicopter rotor, that is, when a disturbance of either the fuselage or rotor can be transmitted to the related component.

To prevent the above instability condition, the present invention proposes to install a universal joint between the fuselage and the rotor making it impossible to transmit a moment from the rotor to the fuselage or from the fuselage to the rotor.

Since the rotor blades at a given coning angle form an inverted cone, and since the inverted cone, when suspended in a medium with a weight at its apex is inherently stable, the rotor blade when displaced will return to the original position that it held before the disturbance.

It can be seen that the only reaction of the fuselage to a rotor disturbance, is a vertical motion which is resisted by the fuselage weight. The forces to restore the original flight condition become greater as the displacement continues to increase.

With the installation of a universal joint between the fuselage and the rotor, a turbine is installed as an integral part of the rotor assembly thereby making the rotor and the power source a cooperating mass for additional stability of the rotor assembly. This is another stabilizing feature peculiar to the present invention.

In order to perform safely at low r.p.m. on or near the ground, a centering device is placed between the rotor turbine and the fuselage. This centering mechanism will be operated by a valve controlled by the rotor r.p.m. The centering mechanism will also be controllable from the cockpit with a switch convenient to the pilot.

The rotor head control mechanism shown in the present invention is an additional simplification on my Patent No. 2,932,353 and is operated by a hydraulic system similar to that presented in the above patent.

The passenger carrying compartment or fuselage, as well as the countertorque rotor are mounted as appendages to the engine, contrary to the conventional practice of mounting the engine in the fuselage. Further, the fuselage is mounted forward of the engine and in an air intake area where a great portion of the engine noise will be insulated from the fuselage.

The rotor drive turbine in the present invention will be free of the main compressor turbine and may be throttled as required for optimum operating efficiency of the rotor, turbine combination. Further, since there is no mechanical connection between the main engine and the rotor turbine, the compressor turbine combination may be operated at optimum r.p.m. These and other advantages will be seen by examining the following drawings, in which.

Figure 1:
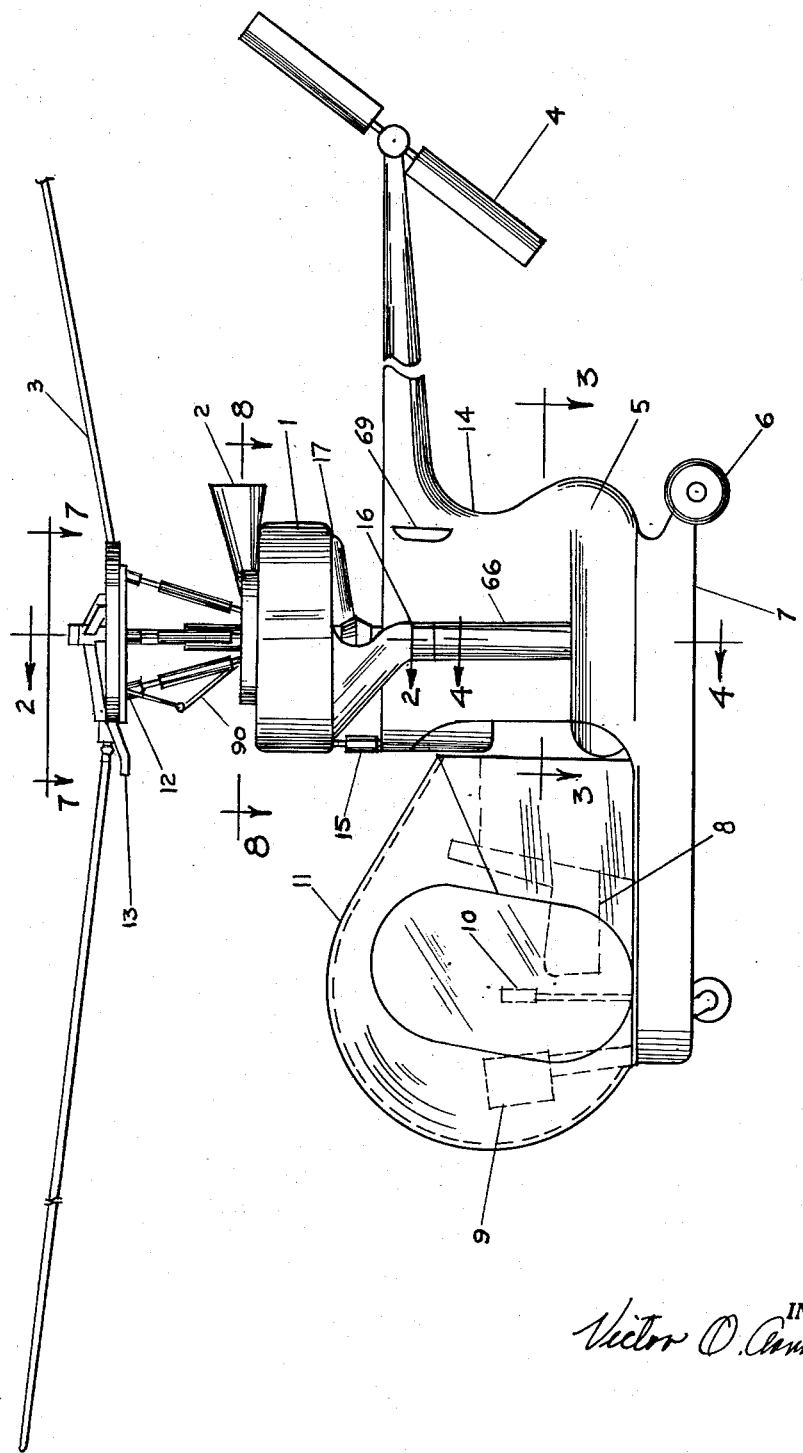
FIGURE 1 is a side elevation of the helicopter in the present invention showing the location of the main components.

Referring in more detail to the drawings:

FIGURE 1 shows a side elevation of the helicopter which is the subject of the present invention. Item 1 is the rotor turbine housing. Item 2 is the exhaust nozzle of the rotor turbine. Item 3 is the main rotor and item 4 is the countertorque rotor. Item 5 is the base structure into which the fuselage support is attached and the mounting base for the compressor. Item 6 is the landing gear and item 7 is the mounting base for the fuselage. The fuselage is equipped with seats 8, instrument panel 9 and control stick 10. Item 11 is a transparent cover allowing maximum vision from all angles. Item 13 is a "droop" stop which is affixed to the rotating portion of the head and supports the blade when the vehicle is on the ground. Conventional drag dampers (not shown) are affixed to the rotor head. The retaining link 90 is attached to the two fixed portions of the rotor head and prevents rotation of element 47 (FIGURE 2) due to the drag of bearings 35 and 40. The lower portion of 90 is attached to housing 34. The upper portion is attached with the actuator to ring 47.

Figure 2:
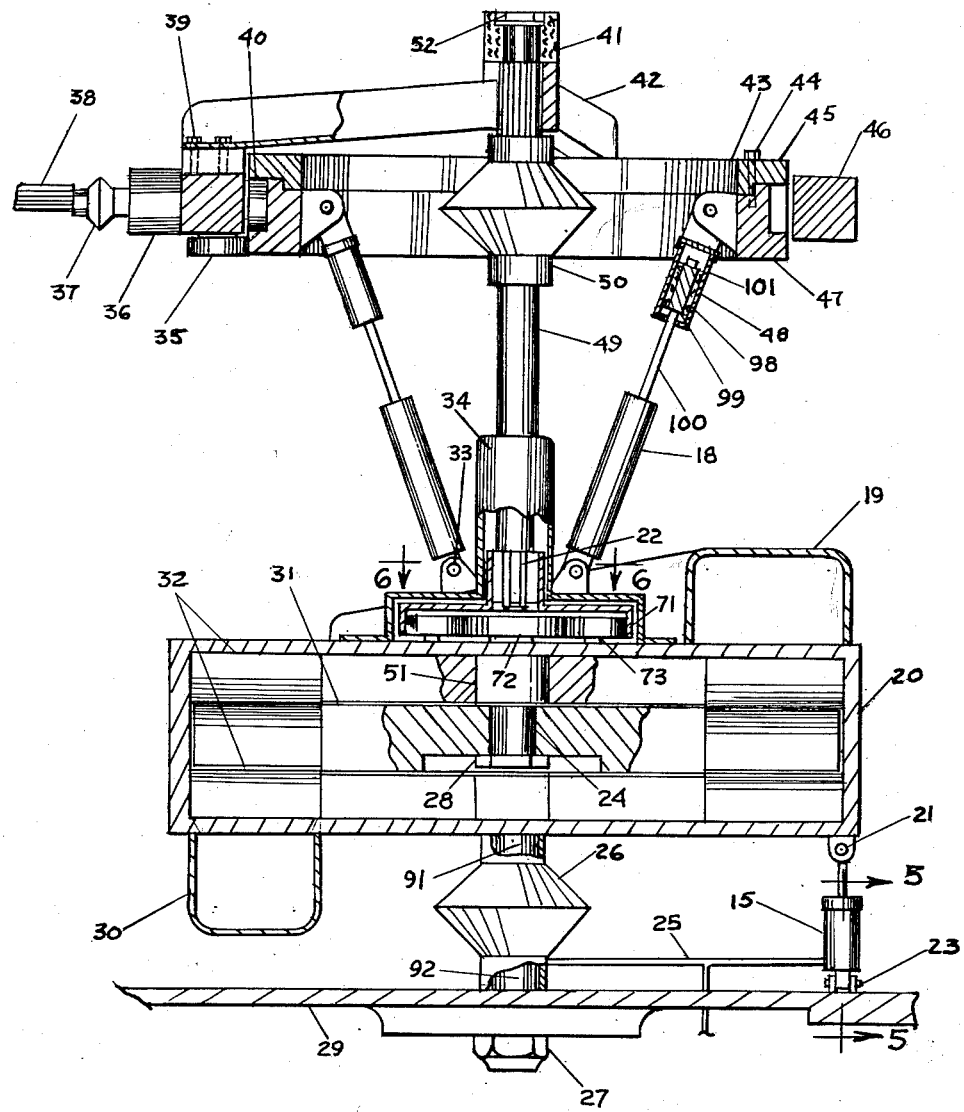
FIGURE 2 is a view taken through the rotor head and driving turbine.
Figure 7:
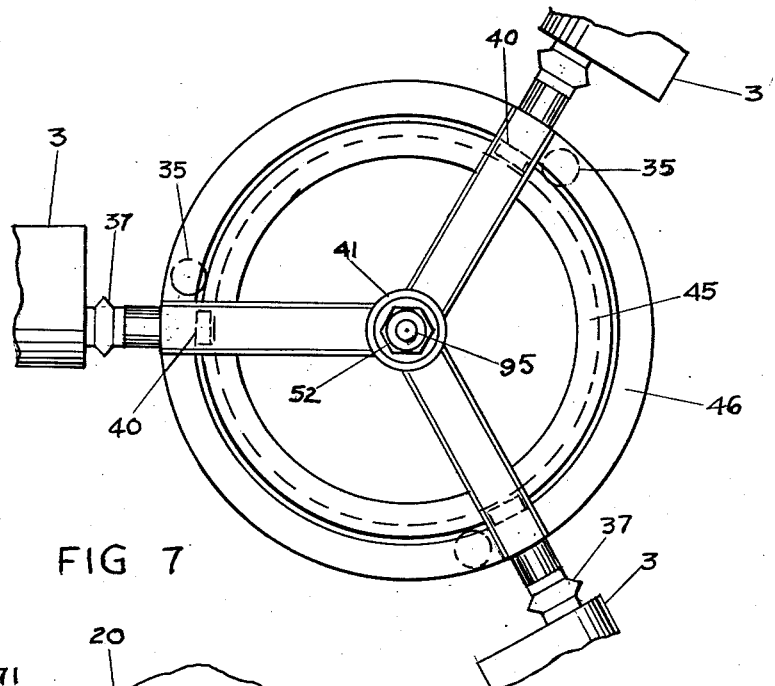
FIGURE 7 is a plan view of the rotor head drive mechanism.

Referring in further detail to FIGURE 2, bearing 40 is made to run in the annular groove or slot formed by 45 and 47. These bearings transmit the rotor lifting force to the rotor head, through spider 42. Spider 42 is caused to rotate by shaft 95 (FIGURE 7) being attached to it by a spline (FIGURE 2) and is allowed to move vertically on the shaft against dampener 41. Retainer nut 52 retains the spider to dampener item 41. Item 48 is placed between actuator 18 and ring 47 to allow vertical motion of the rotor head. Item 48 is a bonded unit being composed of an inner metallic section 99 which is threaded to receive the actuator shaft 100. A resilient insulator 98 is vulcanized to the above metallic section 99 and to the cylinder barrel of item 101.

It will be seen that restricted or dampened motion is allowed between the rotor head and the turbine housing 20. The main rotor blade 38 is attached to centrifugal ring 46 by housing 36 which contains appropriate bearings for thrust and radial loads. Constant speed universal 50 is rigidly attached to shaft item 49 and 95 in such a manner as to transmit the torque supplied by the turbine and to support the weight of the helicopter. The rotor head is positioned by actuators 18 (FIGURE 2) and by the same hydraulic system shown in my Patent No. 2,932,-353.

The actuators 18 are attached to housing item 34 by pins item 33.

Turbine 20 is adapted to receive the shaft 49 through a planetary gear system which is described in detail later in this specification. Turbine 20 is composed of fixed blades 32 and rotating blades item 31. Turbine blade 31 (FIGURE 2) is maintained in position by bearings 51 at either end of shaft 24.

Heated gas from burner housing item 66 (FIGURE 1) generated by burner 65 (FIGURE 2) is expanded through the turbine blades 32 and 31. This gas enters by means of duct item 30 from housing item 66 and is exhausted through duct 19 into exhaust nozzle 1 (FIGURE 1). In this manner blade 31 absorbs the required power to drive main rotor 3.

It is understood that the number of stages in the turbines or the type of compressor used in this invention are shown only for illustrative purposes and are not meant to restrict the invention to the quantities or types shown.

Shaft item 24 (FIGURE 2) is extended through bearing 51 and is rigidly attached to gear 72 which is a part of the planetary gear drive system, an integral part of this rotor system.

Turbine 20 is attached to fitting 29 by universal joint 26. Fitting 29 is a part of the main fuselage.

Universal joint item 26 is rigidly attached to shaft item 91 which in turn is permanently attached to turbine housing item 20.

Shaft item 92 is rigidly attached to universal joint 26 and is permanently attached to fitting 29. Nut 27 is used to secure shaft 92 to fitting 29. It will be seen that as presently described the rotor and turbine are free to move universally relative to the fuselage 14 (FIGURE 1).

Referring again to (FIGURE 2) retainer item 15 is affixed between the turbine and the fuselage in two places, one forward and one to either side to maintain the turbine shaft perpendicular to the fuselage when the retainers are under pressure.

Figure 5:
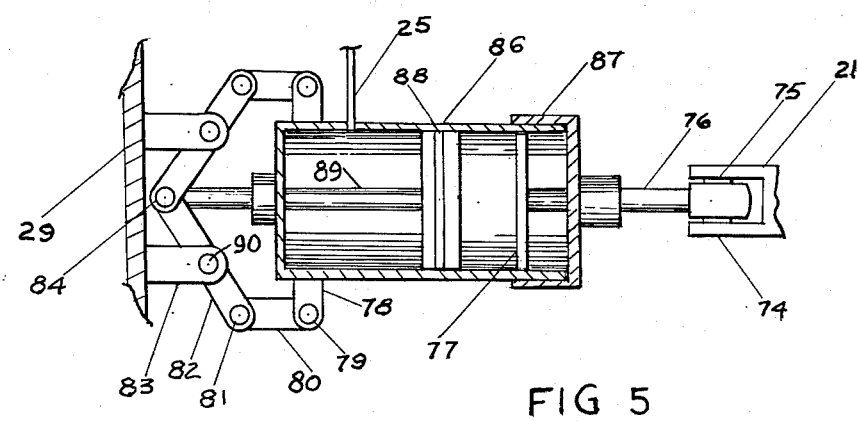
FIGURE 5 is a view through the rotor turbine centering mechanism.

Item 15, a retainer (FIGURE 5), is a unique positioning device adapted to position the turbine relative to the fuselage. This retainer is attached to the hydraulic system (FIGURE 9) by tube 25 which is maintained under a desired pressure for dampening the motion of the fuselage or rotor.

Referring in more detail to (FIGURE 5), item 86 is a housing and item 87 is a retaining cap. Tube 25 is used to apply pressure to the actuator and to maintain a low dampening pressure. Piston 86 is attached to shaft item 89 and to links 82 by pin 84. Arm 78 is a part of housing 86 and moves with it. Support 83 is a part of fitting 29. Line 82 is attached to support 83 by pin 90 and to link 80 by pin 81. Link 80 is attached to arm 78 by pin 79. Ram 77 is attached to shaft 76 which in turn is attached to fitting 21 by pin 74 and self aligning bearing 75. It will be seen that as pressure is applied between piston 88 and housing 86 that piston 88 will move in a relative direction toward cap item 87. At the same time housing 86 due to motion of piston 88 is moving in a relative direction away from cap 87 such as to clamp ram 77 in a position between piston 88 and cap 87. Piston 88 is made adjustable on shaft 89 and ram 77 is made adjustable on shaft 76. These adjustments are only effective during rigging of the vehicle and are fixed in flight.

Figure 9:
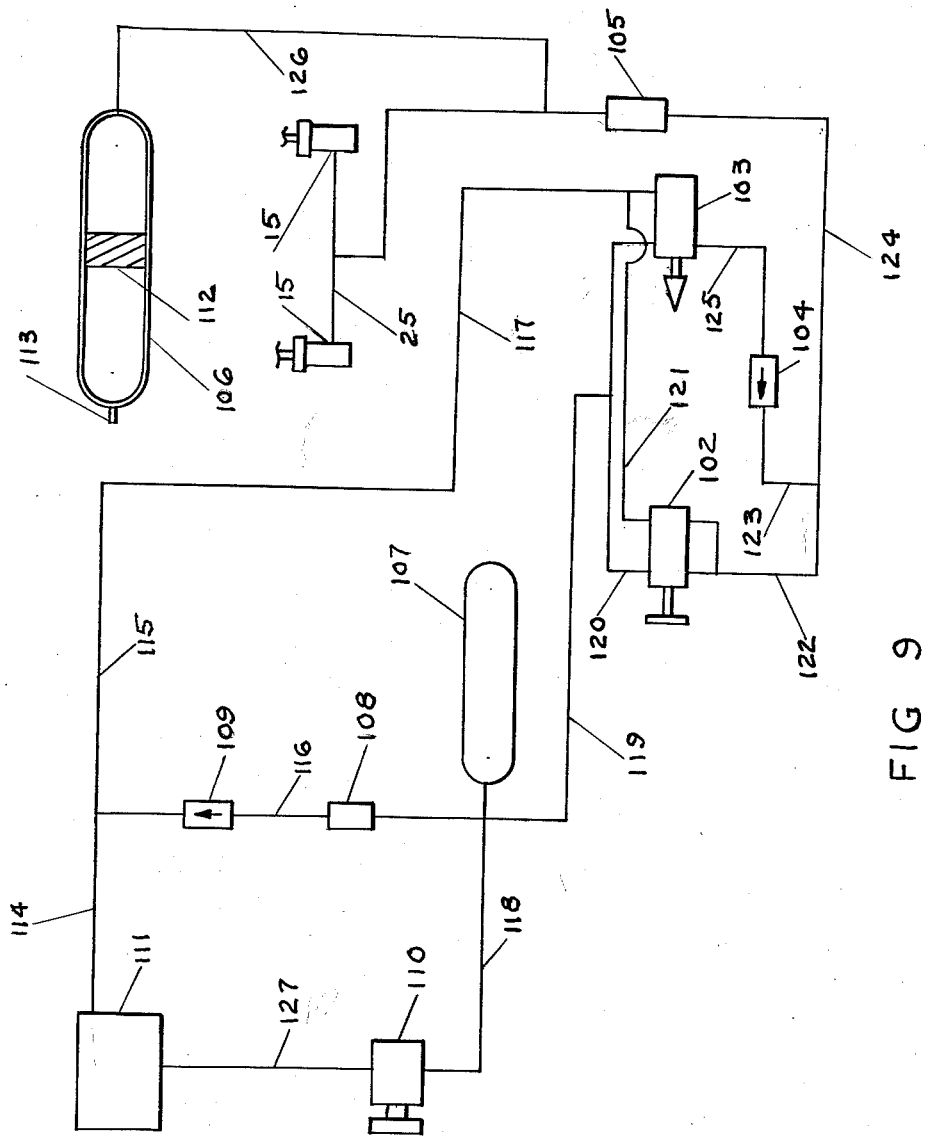
FIGURE 9 is the dampener or centering mechanism hydraulic system.

The dampener 15 is controlled by the following hydraulic system (FIGURE 9);

Item 110 is a hydraulic pump which is attached to the accessory section of the engine and is connected to the supply reservoir by line 127 and to accumulator 107 by line 118. An emergency electric driven pump (not shown) will be installed to provide hydraulic pressure in the event of engine failure.

A constant displacement pump, 110, is shown in this configuration necessitating relief valve 108 which is set slightly above system pressure and allows fluid return to reservoir 111 through tube 116. Check valve 109 and line 114. (It is understood that a variable displacement pump may be used in this installation.)

Check valve 109 restricts the flow of fluid in line 116 to one direction. Accumulator 107 is installed to maintain a constant system pressure. The dampener system is supplied from accumulator 107 through line 119 to the appropriate selector valve. Selector valve 102 is connected mechanically to the rotor and is actuated at a predetermined rotor speed, to lock the turbine 20 to the fuselage and to prevent motion relative thereto.

Valve 103 is installed in the cockpit to facilitate pilot operation. Both valves 102 and 103 are of a conventional type which lock or shut off the flow in either direction at full displacement. Return lines are installed at the return ports of each valve and return the fluid from dampeners 15 to reservoir 111. These lines are numbered 121, 117, and 115.

The supply or pressure ports are connected to lines 124 by lines 122, 123, and 125 (FIGURE 9).

Affixed in line 124 upstream of line 25 is a regulator valve 105. This valve is such that free flow is allowed in the direction of the dampeners 15 but is restricted on return to a dampener pressure established by the pressure in accumulator 106, through line 126. Line 25 interconnects the ports into dampeners 15. Accumulator 106 is composed of a conventional shell into which is installed a floating piston 112 and an air valve 113. It will be seen that the dampener pressure in the system at any time will be that in the air section of accumulator 106.

The system as shown does not return fluid through valve 103 to the reservoir 111. All fluid is returned through valve 102 which is the locking valve to the dampener system. Check valve 104 is installed between lines 123 and 125 to restrict flow to one direction.

It will be seen that the main rotor 3 and turbine 20 are now capable of dampened motion about universal 26.

It will be seen further that a disturbance of the rotor due to aerodynamic forces will not cause the fuselage to take any motion except essentially a vertical motion. Further, no appreciable moment can be transmitted to the fuselage from the rotor except as dictated by the system pressure in retainer item 15.

Figure 6:
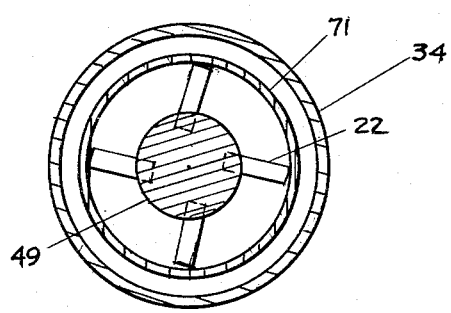
FIGURE 6 is a view through the cam clutch which is an integral part of the rotor drive gear.

Referring in detail to (FIGURES 2 and 6) gear 71 is attached to shaft 49 by cam 22 which is fitted into shaft 49 such as to allow slight motion.

Referring to (FIGURE 6) as gear 71 turns in a counterclockwise direction cam 22 is forced to press against the inside of the housing 71 and to turn shaft 49. In the event of engine failure it will be seen that the relative motion between cam 22 and gear housing 71 will be reversed and the rotor will turn freely experiencing no drag from the planetary gear system.

Figure 8:
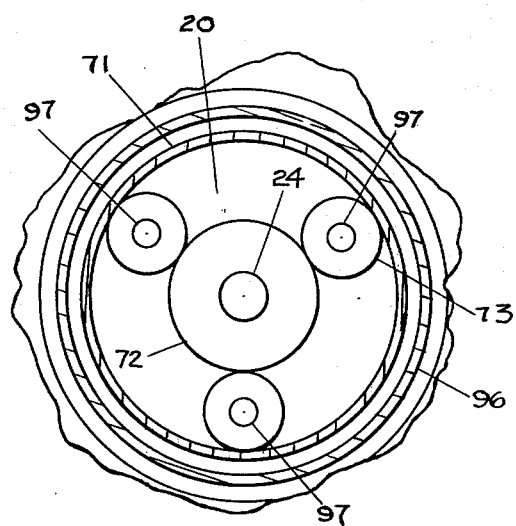
FIGURE 8 is a plan view of the planetary gear drive system.

Referring to (FIGURE 8), gear 73 is attached to housing 20 by shaft 97. As previously stated, gear 72 is rigidly attached to shaft 24, which in turn is attached to turbine blade 31. It will be seen that as the turbine 31 turns clockwise as viewed from the rotor head (FIGURE 7) the rotor blade 3 (FIGURE 1) will be turned in a counterclockwise direction.

The thrust loads and the radial loads generated by the rotor head (FIGURE 2) are distributed into the fuselage through bearings contained in housing 34.

Turbine 20 is free and can be regulated to obtain an optimum speed to satisfy the requirements of the turbine as well as the rotor head.

Figure 3:
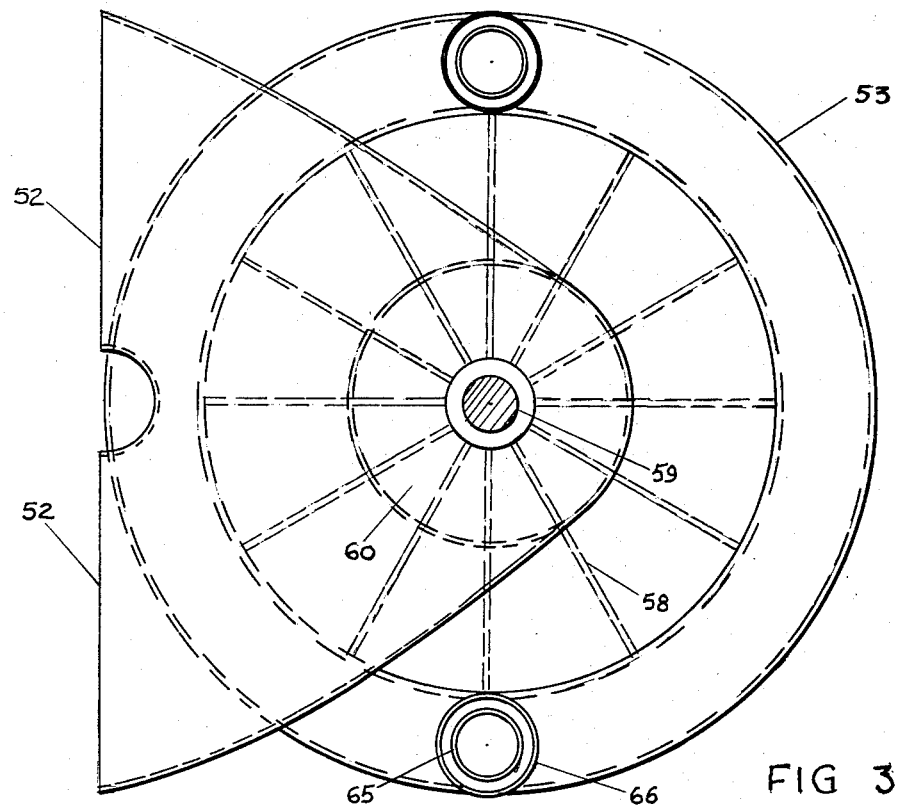
FIGURE 3 is a plan view of the centrifugal compressor.

Referring in detail to (FIGURE 3) 52 is the main inlet for air to the compressor. 53 is the housing for the high pressure air. 59 is the drive shaft connecting the compressor to the driving turbine. Area 60 is the inlet area to the compressor blades 58. 66 is the burner housing and 65 is the burner. Air is drawn into the compressor through inlet 52 into area 60 where it is picked up by blades 58 and compressed by centrifugal force into chamber 53 from which it is bled through burner housing 66 and burner 65 (FIGURE 4).

Figure 4:
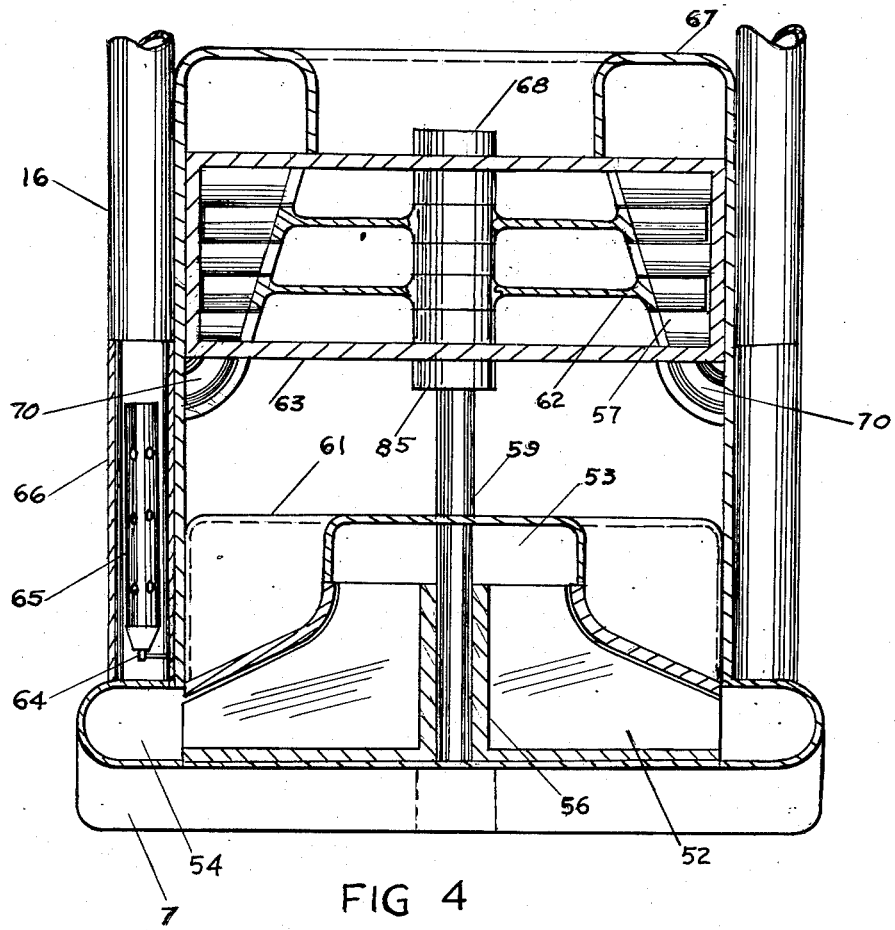
FIGURE 4 is a view through the compressor and turbine assembly showing the interconnecting shaft and general configuration.

As previously stated, shaft 59 extends from the compressor to which it is rigidly attached into turbine blades 62 to which it is permanently attached (FIGURE 4). The compressor blades are attached to hub and base 56 and are retained in space relationship by bearing 68 and 85. Burner 65 is equipped with a fuel spray nozzle and igniter 64. Fuel is sprayed into housing 66 where it is mixed with the compressed air from area 54. The fuel is initially ignited at this point by igniter 64 (FIGURE 4).

A portion of the hot gases leaving burner 65 and housing 66 are bled into area 70 and thence into the fixed turbine blades 57. It is then directed against rotating blades 62 generating power to drive the compressor previously described, as well as the accessories (not shown) and the tail rotor. This gas is expanded through the turbine and into exhaust duct 67 from which it passes to atmosphere through exit nozzle 69 (FIGURE 1). The remainder of the gas passes through flexible duct 16 and into turbine 20 where it is used to drive the main rotor.

The tail rotor 4 on the present invention is a control system identical to that previously described in this specification (FIGURE 2) except that no turbine is attached and universal joint 26 is not used. It is controlled by trim valves in the cockpit (not shown) embodying a hydraulic system similar to that shown in my Patent No. 2,932,353. The stick in the referenced hydraulic system will be replaced by trim knobs located in the cockpit which operate the aforesaid trim valves. By this means it will be seen that the tail rotor can be used for nose up and nose down trim and directional trim as well as for countertorque control.

What is claimed is:
1. A helicopter comprising:
   (a) a fuselage;
   (b) a rotor rotatably supported on and above said fuselage;
   (c) a power plant disposed between said rotor and said fuselage for driving said rotor; and
   (d) means for universally mounting said power plant to said rotor and to said fuselage to permit relative displacement of said fuselage with respect to said rotor.
2. A helicopter comprising:
   (a) a rotor;
   (b) a power plant for supporting and driving said rotor;
   (c) a fuselage supporting said power plant and said rotor; and
   (d) joint means for universally connecting said power plant to said rotor and to said fuselage to permit relative angular displacement of said fuselage with respect to said rotor.
3. A helicopter comprising:
   (a) a power plant including a compressor and a turbine;
   (b) a rotor rotatably supported on said power plant turbine;
   (c) a fuselage supporting said turbine and said rotor;
   (d) said power plant compressor mounted in said fuselage;
   (e) flexible ducting connecting said compressor to said turbine; and
   (f) joint means for universally connecting said turbine to said rotor and to said fuselage to permit relative angular displacement of said fuselage with respect to said rotor.
4. A helicopter comprising:
   (a) a power plant including a compressor and a turbine;
   (b) a rotor rotatably supported on said power plant turbine;
   (c) a tail rotor arrangement supported on said compressor;
   (d) a cabin supported on said compressor forward of said tail rotor;
   (e) flexible ducting connecting said compressor to said turbine; and
   (f) joint means for universally connecting said turbine to said rotor and to said compressor to permit relative angular displacement of said compressor with respect to said rotor.
5. A helicopter comprising:
   (a) a fuselage;
   (b) a rotor carried on and above said fuselage;
   (c) a power plant supported on said fuselage for driving said rotor;
   (d) said power plant including a turbine operably connected to said rotor for driving same, a compressor mounted in said fuselage, an intake duct communicating with said compressor for receiving ram air, and an exhaust exit carried on said turbine for expelling exhaust from said power plant;
   (e) flexible ducting coupling between said compressor and said turbine; and
   (f) joint means for universally connecting said turbine to said rotor and to said compressor to permit relative angular movement of said fuselage with respect to said rotor.
6. The invention as defined in claim 4 including:
a dampening means adjustably secured between said turbine and said fuselage for dampening motion between said fuselage and said rotor.
7. The invention as defined in claim 4 including:
a pair of hydraulically operated piston and cylinder assemblages connected between said turbine and said fuselage adjustable under applied hydraulic pressure for dampening motion between said fuselage and said rotor; and said assemblages being in the same plane and disposed at a right angle with respect to each other.
8. A helicopter comprising:
   (a) a power plant including a compressor and a turbine;
   (b) a rotor rotatably supported on said power plant turbine;
   (c) a fuselage supporting said turbine and said rotor;
   (d) said power plant compressor mounted in said fuselage;
   (e) flexible ducting connecting said compressor to said turbine;
   (f) first universal joint operatively coupling said turbine to said rotor;
   (g) second universal joint operatively coupling said turbine to said fuselage;
   (h) said first and second universal joint permitting relative angular displacement of said fuselage with respect to said rotor to effectively reduce generated vibratory shocks and loads from traveling between said rotor and said fuselage.
9. A helicopter comprising:
   (a) a rotor;
   (b) a power plant for supporting and driving said rotor;
   (c) a fuselage supporting said power plant and said rotor;
   (d) joint means for universally connecting said power plant to said rotor and to said fuselage to permit relative angular displacement of said fuselage with respect to said rotor; and
   (e) positioning means connected between said power plant and said fuselage adapted to position said turbine relative to said fuselage for dampening motion between said fuselage and said rotor.
10. The invention as defined in claim 8 wherein said positioning means includes: a pair of hydraulically operated piston and cylinder assemblages adjustable under hydraulic pressure to selectively limit motion between said fuselage and said rotor.
11. A helicopter comprising:
   (a) a fuselage;

(b) a lifting rotor arrangement carried on and above said fuselage;
(c) a power plant for driving said rotor arrangement having a compressor mounted in said fuselage and a turbine included in said rotor arrangement;
(d) joint means connecting said turbine to said fuselage and said rotor arrangement whereby angular displacement may be allowed between said fuselage and said rotor arrangement;
(e) flexible ducting connected between said turbine and said compressor; and
(f) means for determining the degree of angular displacement between said rotor arrangement and said fuselage connected between said turbine and said fuselage.

12. The invention as defined in claim 11 including: a plurality of resilient damping means extendably connected between said turbine and said lifting rotor arrangement.

13. The invention as defined in claim 12 wherein said damping means are pivotably connected to said turbine and to said rotor arrangement respectively and are adapted to extend and retract to follow angular displacement between said turbine and said rotor arrangement.

References Cited in the file of this patent

UNITED STATES PATENTS

| | | |
|---|---|---|
| 2,404,014 | Thornes | July 16, 1946 |
| 2,795,110 | Chamberlin | June 11, 1957 |

FOREIGN PATENTS

| | | |
|---|---|---|
| 126,866 | Sweden | Dec. 6, 1949 |